(12) United States Patent
Kaise et al.

(10) Patent No.: US 7,426,333 B2
(45) Date of Patent: Sep. 16, 2008

(54) RECORDING APPARATUS AND METHOD, RECORDING MEDIUM AND PROGRAM

(75) Inventors: Fumihiko Kaise, Tokyo (JP); Koji Okumoto, Tokyo (JP)

(73) Assignee: Sony Corporation, Tokyo (JP)

( * ) Notice: Subject to any disclaimer, the term of this patent is extended or adjusted under 35 U.S.C. 154(b) by 651 days.

(21) Appl. No.: 10/480,005

(22) PCT Filed: Apr. 2, 2003

(86) PCT No.: PCT/JP03/04206

§ 371 (c)(1),
(2), (4) Date: Dec. 3, 2003

(87) PCT Pub. No.: WO03/088042

PCT Pub. Date: Oct. 23, 2003

(65) Prior Publication Data

US 2005/0031297 A1 Feb. 10, 2005

(30) Foreign Application Priority Data

Apr. 3, 2002 (JP) ............................. 2002-101673

(51) Int. Cl.
*H04N 5/91* (2006.01)
(52) U.S. Cl. ...................................... 386/95
(58) Field of Classification Search ............... 386/95
See application file for complete search history.

(56) References Cited

U.S. PATENT DOCUMENTS

| 5,509,306 | A | * | 4/1996 | Yamamoto et al. | ........ 73/204.15 |
| 5,590,306 | A | * | 12/1996 | Watanabe et al. | ........... 711/115 |
| 5,731,852 | A | * | 3/1998 | Lee | ............................ 348/719 |
| 5,786,955 | A | * | 7/1998 | Kori et al. | .................. 360/72.1 |
| 5,905,528 | A | | 5/1999 | Kodama | |
| 6,031,959 | A | * | 2/2000 | Hamai et al. | ................... 386/68 |

(Continued)

FOREIGN PATENT DOCUMENTS

EP 1 209 568 A1 5/2002

(Continued)

OTHER PUBLICATIONS

Osamu Kobayashi et al., "Tokushu Flash EEPROM Gaibu Kioku Sochi Muke Shiyo Kankyo Totonou", Nikkei Electronics, Apr. 11, 1994, No. 605, pp. 75-91.

(Continued)

*Primary Examiner*—Thai Q. Tran
*Assistant Examiner*—Anner Holder
(74) *Attorney, Agent, or Firm*—Fulwider Patton LLP

(57) ABSTRACT

Present invention relates to a recording apparatus and method, a recording medium, and a program which are intended to enhance the speed of recording. On the basis of erasure block information and cluster information obtained from a Memory Stick 31, the CPU 11 obtains the size of a data-block configured by clusters and, on the basis of the obtained data block size, adjusts the data block start position, thereby initializing the Memory Stick 31. In recording moving-picture data to the Memory Stick 31, the CPU 11 records the moving-picture data, in units of data blocks, to a data block of which clusters are all free. The present invention is applicable to camera-integrated video recorders or digital still cameras.

12 Claims, 9 Drawing Sheets

U.S. PATENT DOCUMENTS 6,189,081 B1 2/2001 Fujio
6,459,644 B2 * 10/2002 Mizushima et al. .... 365/230.01
6,493,504 B1 * 12/2002 Date et al. .................... 386/95
7,123,813 B2 * 10/2006 Inoue .......................... 386/46

FOREIGN PATENT DOCUMENTS

| JP | 8-221303 A | 8/1996 |
|---|---|---|
| JP | 10-124384 | 5/1998 |
| JP | 11-053248 | 2/1999 |
| JP | 2000-267904 | 9/2000 |
| JP | 2000-298611 | 10/2000 |
| JP | 2001-188701 | 7/2001 |
| WO | WO 03/005178 A2 | 1/2003 |

OTHER PUBLICATIONS

Samuel J. Leffler et al., The Design and Imprementation of the 4.3BSD UNIX Operating System, Addison-Wesley Publishing Company, Inc., 1989, pp. 195-208.

International Search Report, dated Jul. 16, 2003.

* cited by examiner

FIG. 4

| ADDRESS | DATA | | | | | | | |
|---|---|---|---|---|---|---|---|---|
| | C0 | C1 | C2 | C3 | C4 | C5 | C6 | C7 |
| 0000 | f8 ff | ff ff | 03 00 | 04 00 | 07 00 | 06 00 | 0b 00 | 08 00 |
| | C8 | C9 | C10 | C11 | C12 | C13 | C14 | C15 |
| 0010 ↑ | 09 00 | 0a 00 | ff ff | 0c 00 | 0d 00 | 0e 00 | 0f 00 | 10 00 |
| | C16 | C17 | C18 | C19 | C20 | C21 | C22 | C23 |
| 0020 ↑ | ff ff | 00 00 | 00 00 | 00 00 | 00 00 | 00 00 | 00 00 | 00 00 |
| | C24 | C25 | C26 | C27 | C28 | C29 | C30 | C31 |
| 0030 ↑ | 00 00 | 00 00 | 00 00 | 00 00 | 00 00 | 00 00 | 00 00 | 00 00 |

FIG. 9

| ADDRESS | DATA | | | | | | | |
|---|---|---|---|---|---|---|---|---|
| | d0 | | | d1 | | | | |
| 0000 | C0<br>f8 ff | C1<br>ff ff | C2<br>03 00 | C3<br>04 00 | C4<br>05 00 | C5<br>06 00 | C6<br>0b 00 | C7<br>08 00 |
| | d2 | | | d3 | | | | |
| 0010 ← | C8<br>09 00 | C9<br>0a 00 | C10<br>ff ff | C11<br>0c 00 | C12<br>0d 00 | C13<br>0e 00 | C14<br>0f 00 | C15<br>10 00 |
| | d4 | | | d5 | | | | |
| 0020 ← | C16<br>ff ff | C17<br>00 00 | C18<br>00 00 | C19<br>00 00 | C20<br>00 00 | C21<br>00 00 | C22<br>00 00 | C23<br>00 00 |
| | d6 | | | d7 | | | | |
| 0030 ← | C24<br>00 00 | C25<br>00 00 | C26<br>00 00 | C27<br>00 00 | C28<br>00 00 | C29<br>00 00 | C30<br>00 00 | C31<br>00 00 |
| ------ | | | | | | | | |
| | d62 | | | d63 | | | | |
| 01f0 ← | C248<br>00 00 | C249<br>00 00 | C250<br>00 00 | C251<br>00 00 | C252<br>00 00 | C253<br>00 00 | C254<br>00 00 | C255<br>00 00 | ly to a recording apparatus and method, a recording medium, and a program and, more particularly, to a recording apparatus and method, a recording medium, and a program which are intended to enhance the speed of flash memory writing operations.

RECORDING APPARATUS AND METHOD, RECORDING MEDIUM AND PROGRAM

RELATED APPLICATIONS

This is a U.S. national phase of PCT/JP03/04206 filed 2 Apr. 2003, claiming priority from Japanese patent application P2002-101673 filed 3 Apr. 2002.

TECHNICAL FIELD

The present invention relates generally to a recording apparatus and method, a recording medium, and a program and, more particularly, to a recording apparatus and method, a recording medium, and a program which are intended to enhance the speed of flash memory writing operations.

BACKGROUND ART

In flash memories, data are recorded or erased in units of blocks (erasure blocks). On the other hand, in computer systems based on an MS-DOS (trademark) OS (Operating System), a FAT (File Allocation Table) file system is usually used for recording and erasing data on their hard disks, so that the FAT file system is also often used for recording data to flash memories.

In the FAT file system, data are managed in units of a cluster configured by a plurality of sectors such as 4, 8, 16, or 32 for example. Conventionally, the size of the cluster is greater than the size of the erasure block of flash memories.

Recently, however, as the flash memory storage capacities increase, the erasure block size comes to exceed the maximum cluster size.

As the erasure block size exceeds the cluster size, the data of a plurality of clusters come to be stored in one erasure block, for example. Consequently, rewriting the data of one cluster must once read the data of one erasure block which contains that cluster (the data of a plurality of clusters), store these pieces of data into memory, rewrite the data of the cluster concerned in memory, and then write the data of the plurality of clusters which contain that cluster to the initial one erasure block. This inevitably increases the time of the data write operation.

In order to manage flash memories having a large erasure block size, it is proposed to enlarge (over the erasure block size) the cluster size to be managed by the FAT file system.

However, this approach involves a special FAT file system, thereby losing the compatibility with general-purpose personal computers using the conventional FAT file system. In addition, because one cluster is occupied even by 1-byte data for example in the above-mentioned proposition, if the cluster size is enlarged and if 1-byte data are recorded for example, the wasted areas increase, thereby presenting problems of a lowered memory usage efficiency for example.

DISCLOSURE OF INVENTION

It is therefore an object of the present invention to increase the writing speed of flash memories while minimizing the lowered memory usage efficiency.

In carrying out the invention and according to one aspect thereof, there is provided a recording apparatus including first detecting means for detecting the plurality of clusters which are free, second detecting means for detecting the erasure block in which the plurality of clusters are all free and recording means for recording data to the plurality of clusters of the erasure block detected by the second detecting means.

In the above-mentioned recording apparatus, the recording memory may be a flash memory.

In the above-mentioned recording apparatus, a FAT system is formed in the recording medium and the first detecting means detects the plurality of free clusters from the FAT.

The above-mentioned recording apparatus further includes first calculation means for calculating a remaining free capacity of the recording medium from the number of the clusters detected by the first detecting means, and second calculation means for calculating a remaining free capacity of the recording medium from the number of the clusters of the erasure block detected by the second detecting means.

The above-mentioned recording apparatus further includes determining means for determining whether or not data to be recorded to the recording medium is moving-picture data, wherein if the data to be recorded to the recording medium is found by the determining means to be moving-picture data, then the recording means records the data to the plurality of clusters of the erasure block detected by the second detecting means.

The above-mentioned recording apparatus still further includes determining means for determining whether or not data to be recorded to the recording medium is still-picture data, wherein if the data to be recorded to the recording medium is found by the determining means to be still-picture data, then the recording medium records the data to the plurality of clusters detected by the first detecting means.

The above-mentioned recording medium yet further including display means for displaying a free remaining capacity of the recording medium obtained by the first calculation means or the second calculation means.

The above-mentioned recording apparatus further includes: determining means for determining whether or not data to be recorded to the recording medium is moving-picture data, wherein if the data to be recorded to the recording medium is found by the determining means to be moving-picture data, then the display means displays the remaining free capacity of the recording medium obtained by the second calculation means.

The above-mentioned recording apparatus still further includes determining means for determining whether or not data to be recorded to the recording medium is still-picture data, wherein if the data to be recorded to the recording medium is found by the determining means to be still-picture data, the display means displays the remaining free capacity of the recording medium obtained by the first calculation means.

In carrying out the invention and according to another aspect thereof, there is provided a recording method including a first detecting step for detecting the plurality of clusters which are free, a second detecting step for detecting the erasure block in which the plurality of clusters are all free, and a recording step for recording data to the plurality of clusters of the erasure block detected by the second detecting step.

In carrying out the invention and according to still another aspect thereof, there is provided a program for a recording medium including a first detecting step for detecting the plurality of clusters which are free, a second detecting step for detecting the erasure block in which the plurality of clusters are all free, and a recording step for recording data to the plurality of clusters of the erasure block detected by the second detecting step.

In carrying out the invention and according to yet another aspect thereof, there is provided a program including a first detecting step for detecting the plurality of clusters which are free, a second detecting step for detecting the erasure block in which the plurality of clusters are all free, and a recording step for recording data to the plurality of clusters of the erasure block detected by the second detecting step.

In the recording apparatus and method, the recording medium, and the program according to the invention, free clusters are detected and an erasure block of which clusters are all free is detected. Data is recorded to the free clusters of the detected erasure block.

The recording apparatus may be an independent apparatus or a recording block of a recording/reproducing apparatus.

BRIEF DESCRIPTION OF DRAWINGS

FIG. 4 is a diagram for describing an example of FAT data in the recording processing shown in FIG. 6;

FIG. 9 is a diagram for describing still another example of the FAT data in the recording processing shown in FIG. 6.

BEST MODE FOR CARRYING OUT THE INVENTION

This invention will be described in further detail by way of example with reference to the accompanying drawings.

Figure 1:
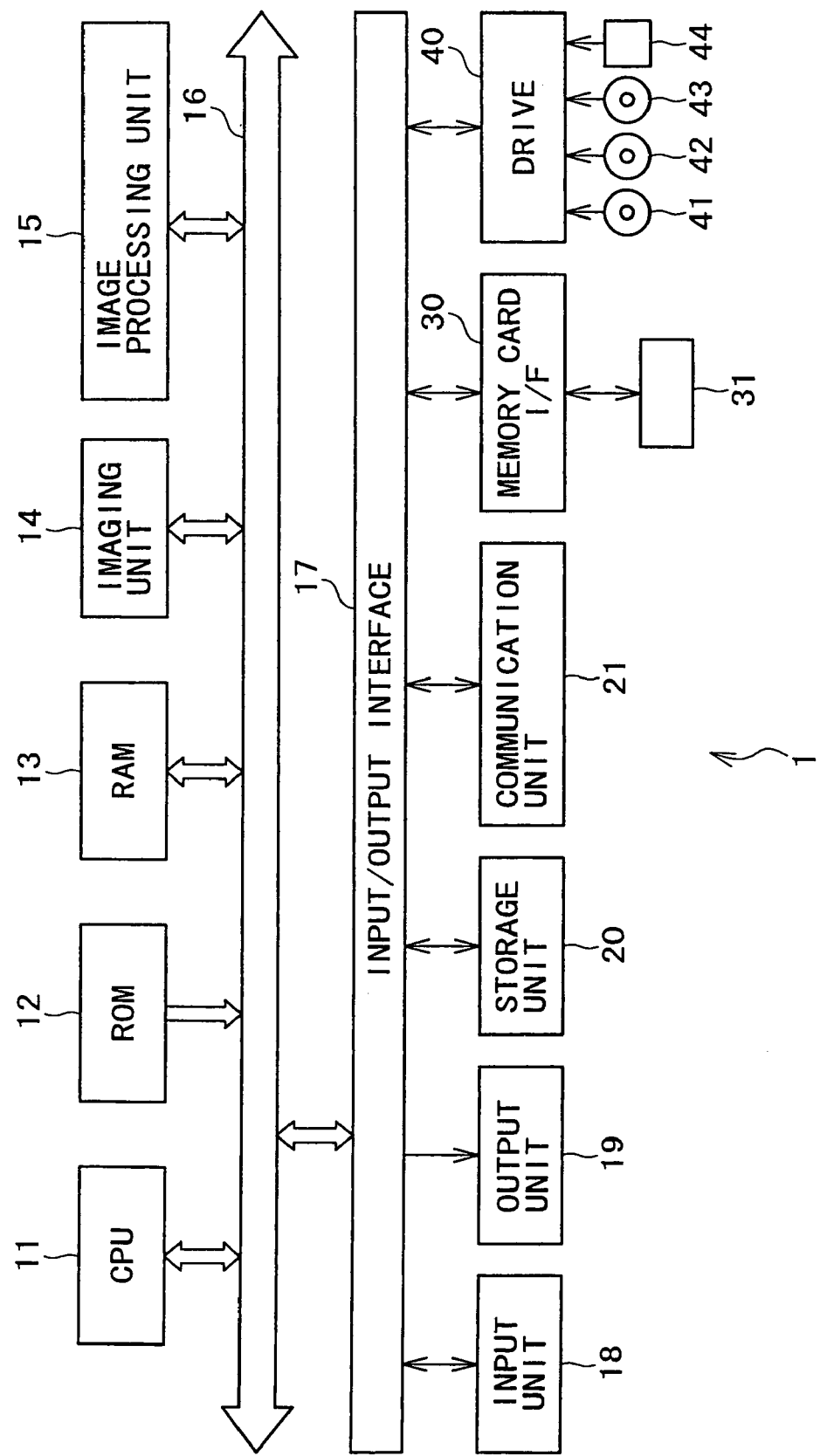
FIG. 1 is a block diagram illustrating an exemplary configuration of an imaging apparatus to which the present invention is applied.

Now, referring to FIG. 1, there is shown an exemplary configuration of an imaging apparatus 1 to which the present invention is applied. The imaging apparatus 1 is configured by a camcorder (a camera-integrated video recorder) or a digital still camera (DSC) for example. In FIG. 1, a CPU (Central Processing Unit) 11 executes various processing operations in accordance with a program stored in a ROM (Read Only Memory) 12 or a program loaded from a storage unit 20 into a RAM (Random Access Memory) 13. For the OS (Operating System) of the CPU 11, MS-DOS (trademark) is used. Further, the CPU 11 controls the imaging apparatus 1 in its entirety in accordance with instructions entered by the user through an input unit 18. The RAM 13 also appropriately stores the data which are necessary for the CPU 11 to execute various processing operations.

In the imaging apparatus 1, an object is imaged by an imaging unit 14 and the corresponding moving-picture data or still-picture data are outputted. The user may operate buttons for example constituting an input unit 18 to select the moving-picture imaging mode or the still-picture imaging mode (in what follows, the moving-picture imaging mode is referred to as the moving-picture mode and the still-picture imaging mode as the still-picture mode), thereby executing an imaging operation.

On the basis of the imaging mode selected by the user, the imaging unit 14 takes a picture of an object and supplies its moving-image data or still-image data to an image processing unit 15. The image processing unit 15 performs such image processing on the supplied data imaged by the imaging unit 14 as color conversion, gamma correction, and resolution conversion.

The CPU 11, the ROM 12, and RAM 13, the imaging unit 14, and the image processing unit 15 are interconnected via a bus 16. This bus 16 is also connected to an input/output interface 17.

The input/output interface 17 is connected to the input unit 18 composed of buttons and dials for example, a display device constituted by a CRT (Cathode Ray Tube) or an LCD (Liquid Crystal Display), an output unit 19 constituted by a speaker for example, a storage unit 20 constituted by a hard disk for example, and a communication unit 21 constituted by a modem and a terminal adaptor for example. The communication unit 21 executes communication processing via a network (not shown).

The input/output interface 17 is also connected to a memory card interface (I/F) 30.

The memory card interface 30 performs initialization processing on a Memory Stick (trademark), 31 for example, which is a typical flash memory, loaded thereon, on the basis of instructions by the CPU 11, and executes the processing of recording and reproducing the moving-picture data or still-picture data taken by the imaging unit 14 and processed by the image processing unit 15.

In the Memory Stick 31, data are recorded and erased in units of blocks (hereafter referred to as erasure blocks).

The input/output interface 17 is also connected to a drive 40 as required. On the drive 40, a magnetic disk 41, an optical disk 42, a magneto-optical disk 43, or a semiconductor memory 44 is loaded appropriately, computer programs read therefrom being installed in the storage unit 20 as required.

Figure 2:
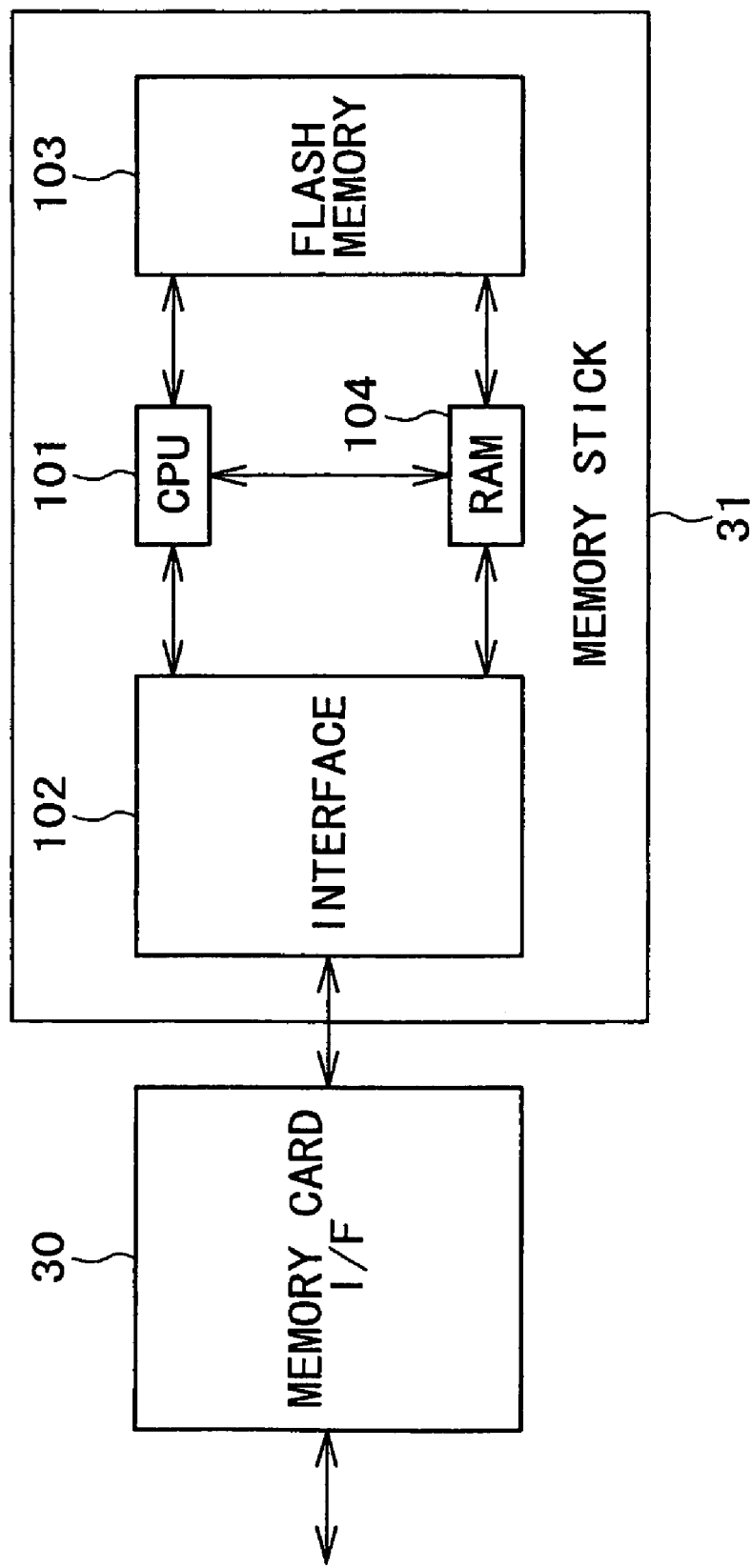
FIG. 2 is a block diagram illustrating the internal configuration of a Memory Stick shown in FIG. 1.

Referring to FIG. 2, there is shown the internal configuration of the Memory Stick 31. It should be noted that, with reference to FIG. 2, similar components previously described with reference to FIG. 1 are denoted by the same reference numerals and their description will be skipped for the sake of brevity.

The Memory Stick 31 is constituted by a CPU 101, an interface (I/F) 102, a flash memory 103, and a RAM 104.

The CPU 101 receives, via the interface 102, instructions by the CPU 11 of the imaging apparatus 1 entered from the memory card interface 30 and controls the entire Memory Stick 31 accordingly. The CPU 101 stores data into the flash memory 103 and initializes the flash memory 103 in accordance with the instructions given by the CPU 11 of the imaging apparatus 1.

The RAM 104, under the control of the CPU 101, temporarily stores the data stored in the Memory Stick 31 or the data stored in the flash memory 103.

Figure 3:
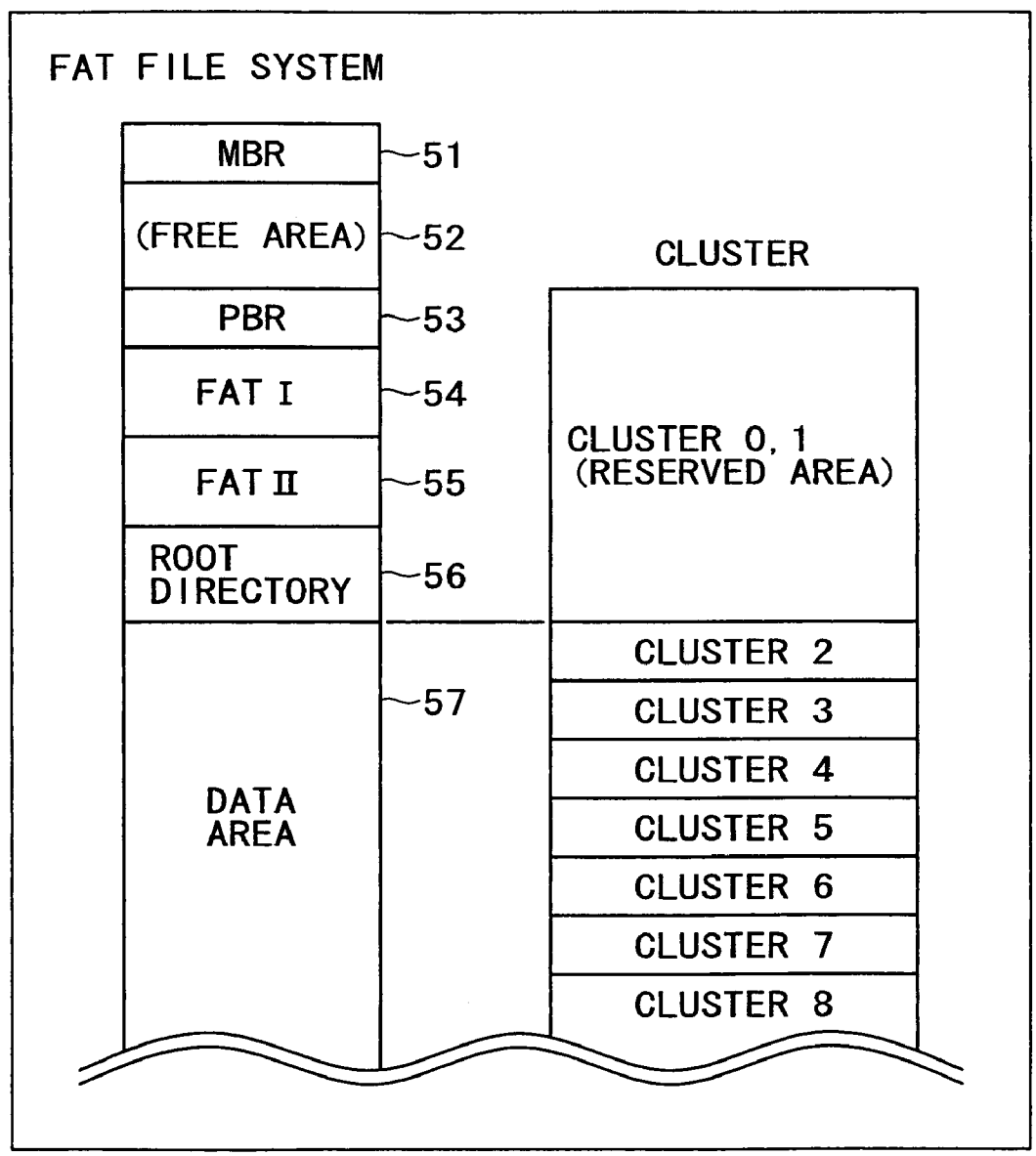
FIG. 3 is a diagram for describing a FAT file system.

The following describes a FAT (File Allocation Table) file system, which is a method of managing the data stored in the Memory Stick 31, with reference to FIG. 3. A plurality of FAT file systems may be created in the Memory Stick 31. The Memory Stick 31 is divided into partitions, in each of which one file system is arranged. In this example, one partition is allocated to the Memory Stick 31, in which one FAT system is formed.

The FAT file system uses two recording units of logical sector and cluster to manage the recording areas of each recording medium (in this example, the Memory Stick 31). Each of logical sectors is generally 512 bytes wide, which are sequentially numbered starting from the head of the Memory Stick 31. On the other hand, each cluster is configured by a plurality of logical sectors (4, 8, 16, or 32 sectors).

Referring to FIG. 3, there is shown the relationship between the logical arrangement of the FAT file system and the data area (clusters) in the Memory Stick 31.

The FAT file system is configured by an MBR (Master Boot Record) 51, a PBR (Partition Boot Record) 53, a FATI 54, a FATII 55, a root directory 56, and a data area 57.

The MBR 51 is the data to be stored at the start address of the FAT file system. The MBR 51 includes such information unique to the Memory Stick 31 as the information about each file system existing in the Memory Stick 31 and the information about each partition range of the Memory Stick 31. The data in the MBR 51 are rewritten every time the Memory Stick 31 is initialized and the allocation of partitions is performed.

The PBR 53 and on that follow a free area 52 are managed for each partition constituting the Memory Stick 31, so that there are the same number of these items as the number of partitions.

The PBR 53 is the data stored at the start address of each partition formed in the Memory Stick 31. The PBR 53 includes address information about such areas in which the management information is stored as the FATI 54, the FATII 55, and the root directory 56, the address information of the data area 57, and the information about the corresponding partition.

The FATI 54 is an area in which the table data (FAT data) indicative of the usage status of each cluster in the data area 57 are stored. The FATII 55 also stores a copy (namely, the same data) of the FATI 54. The root directory 56 stores the data indicative of the information about the files in the root directory and the information about the subdirectories in this Memory Stick 31;

The data area 57 is an area for storing data. The CPU 11 manages the data area 57 on a cluster basis. Of the clusters in the data area 57 managed by the CPU 11, cluster 0 and cluster 1 provide a area reserved by the OS, so that the clusters (cluster 2, cluster 3, and so on) starting with cluster 2, which are managed in their sequential numbers, provide an area in which data may be substantially recorded.

The following describes the FAT data of the FATI 54 which indicate the usage status of each cluster in the data area 57, with reference to FIG. 4.

Referring to FIG. 4, there is shown the FAT data of the FATI 54 in a 16-bit FAT system.

The FAT data are a table containing the information (entries) indicative in which cluster the continuation of data is entered for each cluster. Namely, entry c0, entry c1, entry c2, and so on store the information about the data stored in cluster 0, cluster 1, cluster 2, and so on in the data area 57 respectively. The FAT data start with the data in entry c0 of cluster 0, which is the logical first cluster managed by the FAT data.

As shown in FIG. 4, entry c2 for example stores the data to be stored in cluster 2 in the data area 57 and is configured by 2 bytes, "03" and "00" in this example. "03", byte 1 of entry c2, indicates that the continued data are stored in cluster 3 (namely, the substantial value of the 2 bytes are represented in "00" "03" (0003) obtained by replacing the first byte "03" with the last byte "00"). In the FAT data, if the continuation of data does not exist in the subsequent clusters, "ff" "ff" indicative of EOF (end of file) is written; in the case of an empty cluster, "00" "00" are written as shown in entry c18 for example.

It should be noted, because cluster 0 and cluster 1 are reserved by the OS, "f8" "ff" and "ff" "ff" are written to entries c0 and c1 respectively. Namely, the logical first cluster managed by the FAT is cluster 0; actually, however, the information of data area 57 is written starting with entry c2 (the entry of cluster 2).

Referring to FIG. 4, the value of entry c2 is "03" "00", the value of entry c3 is "04" "00", the value of entry c4 is "07" "00", the value of entry c7 is "08" "00", the value of entry c8 is "09" "00", the value of entry c9 is "0a" "00", and the value of entry c10 is "ff" "ff", so that it is apparent that data 1 of which recording started with cluster 2 are sequentially stored in clusters 3, 4, 7, 8, 9, and 10. The value of entry c5 is "06" "00", the value of entry c6 is "0b" "00", the value of entry c11 is "0c" "00, the value of entry c12 is "0d" "00", the value of entry c13 is "0e" "00", the value of entry 14 is "0f" "00", the value of entry c15 is "10" "00, and the value of entry c16 is "ff" "ff", so that it is apparent that data 2 of which recording started with cluster 5 are sequentially stored in clusters 6, 11, 12, 13, 14, 15, and 16. Further, the values of entry c17 and the subsequent entries are "00" "00", so that it is apparent that cluster 17 and subsequent clusters are free areas.

It should be noted that addresses "0000", "0010", "0020", and "0030" shown to the left of the figure indicate the internal addresses at which the data of the FATI 54 are written.

In order to create the above-mentioned FAT file system in the Memory Stick 31, the CPU 11 initializes the Memory Stick 31. The following describes this initialization processing with reference to the flowchart shown in FIG. 5.

In order to initialize the Memory Stick 31, the user loads the Memory Stick 31 on the memory card interface 30 of the imaging apparatus 1. Upon detection of the loading of the Memory Stick 31, the CPU 11 controls the memory card interface 30 to get the erasure block information from the Memory Stick 31 in step S1. Namely, the CPU 101 of the Memory Stick 31 reads the erasure block size set internally to the device and outputs the erasure block size via the interface 102. Consequently, value 128 Kbytes is obtained as the erasure block size.

In step S2, the CPU 11 controls the memory card interface 30 to get the cluster information from the Memory Stick 31. For example, the CPU 101 of the Memory Stick 31 reads the cluster size from the PBR 53 and outputs the cluster size to the CPU 11. Consequently, a value of 32 Kbytes is obtained for example.

In step S3, on the basis of the erasure block size obtained in step S1 and the cluster size obtained in step S2, the CPU 11 obtains a data block size. The data block size is represented by the number of clusters which form one erasure block. In step S4, on the basis of the data block size obtained in step S3, the CPU 11 adjusts the data block start position and performs the initialization.

Figure 6:
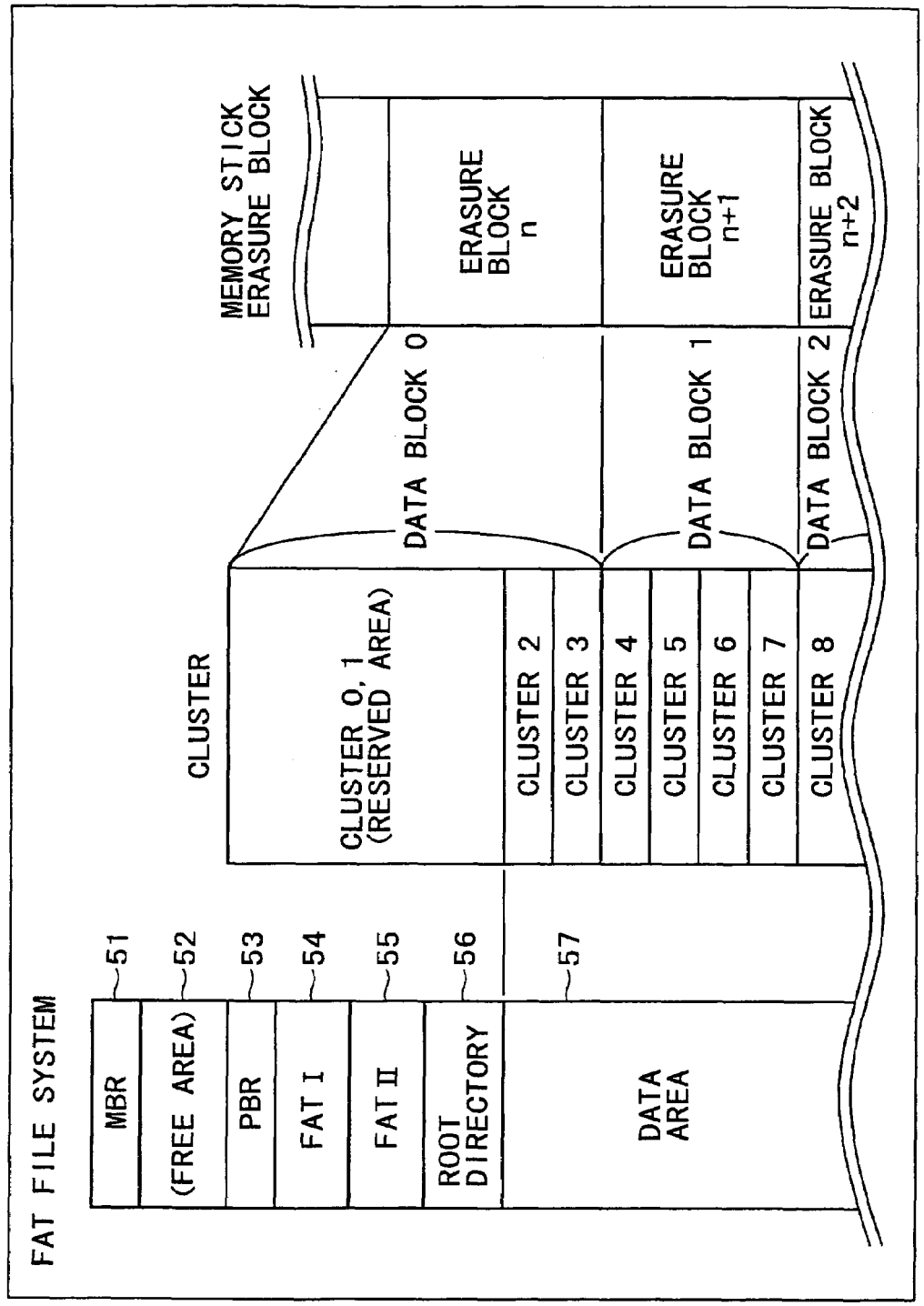
FIG. 6 is a diagram for describing the relationship between clusters and blocks.

The following describes the details of the processing of above-mentioned steps S3 and S4 with reference to FIG. 6.

In the present example, the data block size is 4 clusters because the erasure block size is 128 Kbytes obtained in step S1 and the cluster size is 32 Kbytes obtained in step S2. Therefore, in step S4, the processing is executed with 4 clusters in the data area 57 being 1 data block (erasure block).

It should be noted that, for the convenience of description, the erasure block and the data block are separately described; however, because a collection of clusters equivalent to the erasure block is regarded as the data block, erasure block n+1 and data block 1 for example indicate the same area.

The actual usage status of the data area 57 is written starting with entry c2 (the entry of cluster 2); however, because the FAT data of FATI 54 logically start with entries c0 and c1 (the entry of cluster 0 and the entry of cluster 1), the data block start position is adjusted such that the FAT data are matched with cluster 0, which is the logical first cluster to be managed by the FAT. Namely, the 4 clusters (clusters 0 through 3) including the data for the first 2 clusters (cluster 0 and cluster 1), which are the reserved area for the OS, provide 1 data block and the processing is executed with the subsequent 4 clusters in the data area 57 being 1 data block sequentially.

Therefore, as shown in FIG. 6, cluster 0 (reserved area)+ cluster 1 (reserved area)+cluster 2 (data area)+cluster 3 (data area) provide data block 0 which is equivalent to erasure block n, and cluster 4 (data area)+cluster 5 (data area)+cluster 6 (data area)+cluster 7 (data area) provide data block 1 which is equivalent to erasure block n+1. Likewise, the subsequent every four clusters in the data area 57 provide 1 data block sequentially.

Figure 7:
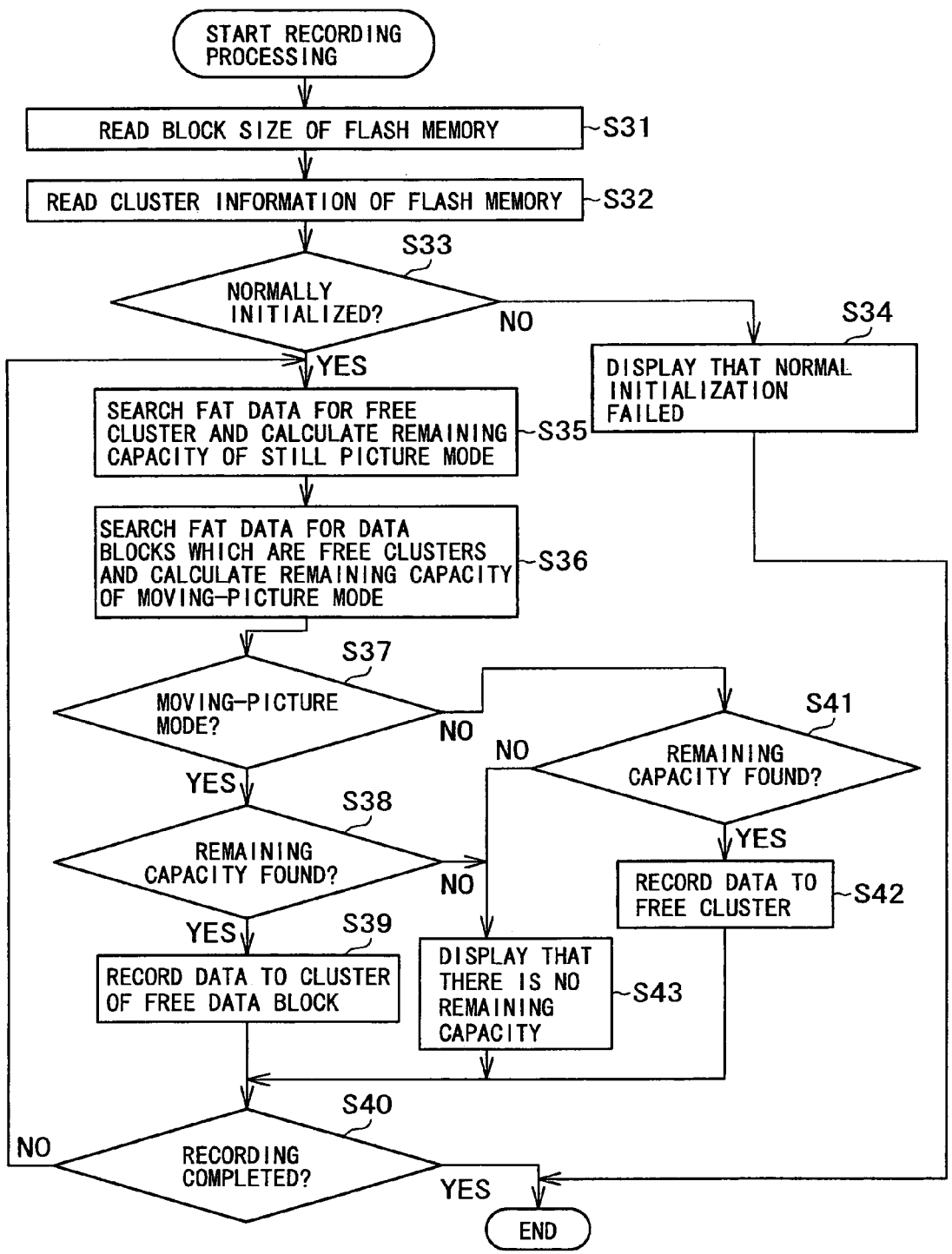
FIG. 7 is a flowchart for describing the recording processing in the imaging apparatus shown in FIG. 1.

The following describes the recording processing of the Memory Stick 31 initialized as described above, with reference to the flowchart shown in FIG. 7.

In order to record the moving-picture data or the still-picture data being taken to the Memory Stick 31, the user loads the Memory Stick 31 on the memory card interface 30 of the imaging apparatus 1 and presses the record start button of the input unit 18. Upon detection of the loading of the Memory Stick 31, the CPU 11 controls the memory card interface 30 to get the erasure block information from the Memory Stick 31 in step S31. For example, the CPU 101 of the Memory Stick 31 reads the erasure block size (for example, 128 Kbytes) set to the device and informs the CPU 11 of this erasure block size. At the same time, a recommended initialization parameter is supplied.

In step S32, the CPU 11 controls the memory card interface 30 to get the cluster information from the Memory Stick 31. For example, the value of the cluster size (for example, 32 Kbytes) is obtained from the PBR 53 of the Memory Stick 31.

Figure 5:
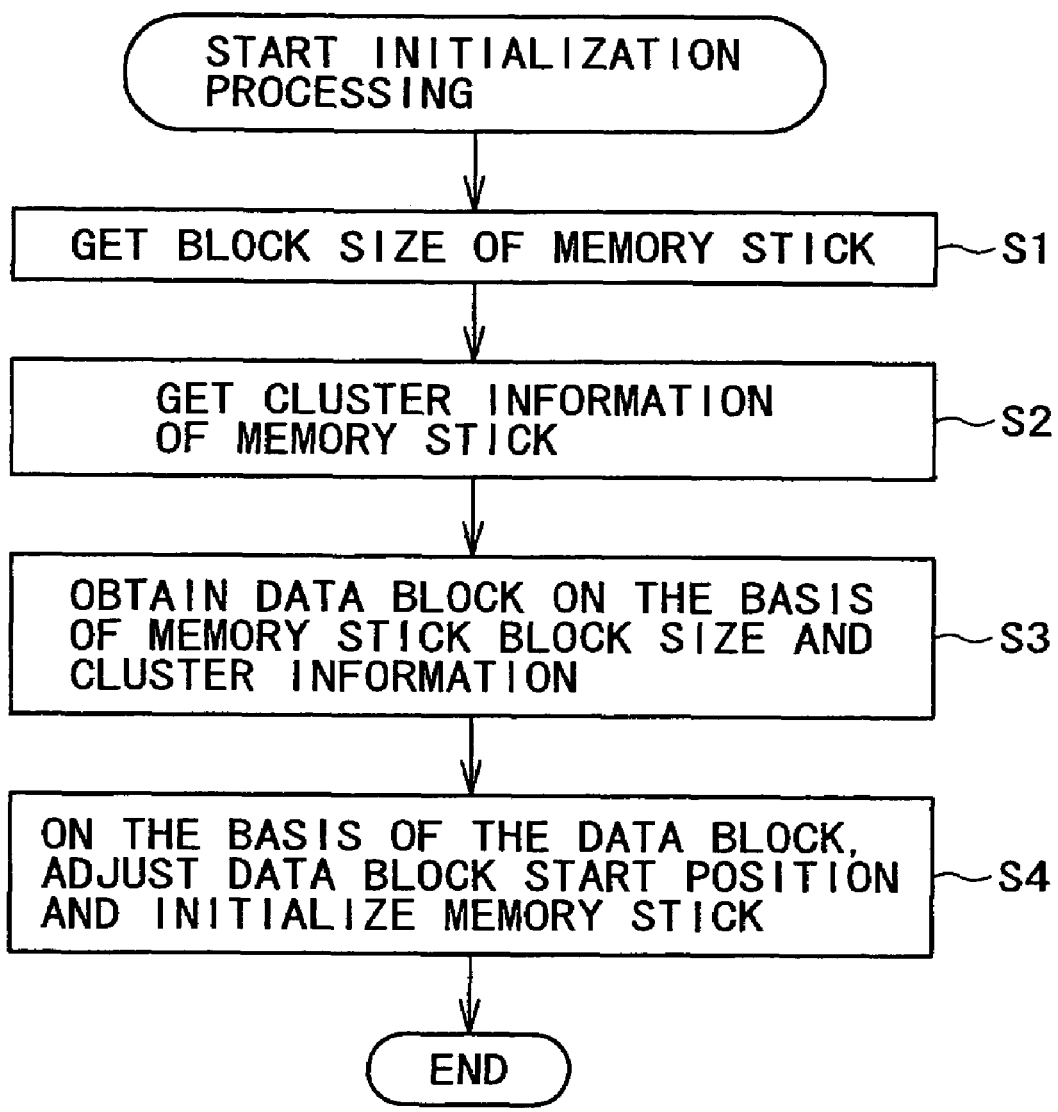
FIG. 5 is a flowchart for describing the initialization processing of the Memory Stick in the imaging apparatus shown in FIG. 1.

In step S33, the CPU 11 determines on the basis of the recommended initialization parameter received in step S31 whether or not the Memory Stick 31 has been properly initialized. Namely, in step S33, whether or not the initialization has been performed (the data block start position has been adjusted) as described with reference to the flowchart shown in FIG. 5 is determined.

If the Memory Stick 31 is found not properly initialized in step S33, then the CPU 11 displays, in step S34, that the Memory Stick 31 has not been properly initialized onto the monitor for example of the output unit 19, thereby ending the recording processing.

It should be noted that, in this case, the recording processing is ended; it will be apparent that the Memory Stick 31 may be initialized again or the recording of moving-picture data may be prohibited.

If the Memory Stick 31 is found properly initialized in step S33, then the CPU 11 calculates the remaining capacity of the Memory Stick 31 for recording the still-picture data (in the case of the still-picture mode) in step S35.

In the case of recording still-picture data in the imaging apparatus 1, the CPU 11 detects all free clusters from the FATI 54. To be more specific, the clusters (in the example shown in FIG. 4, entries c17, c18, c19, c31, ... ) with the value of entry Ci (i=0, 1, 2, ... ) is "00" "00" are detected. In step S35, the remaining capacity of the Memory Stick 31 is calculated on the basis of the number of all detected clusters.

Next, on the basis of the erasure block size (128 Kbytes) obtained in the processing of step S31 and the cluster size (32 Kbytes) obtained in the processing of step S32, the CPU 11 calculates the remaining capacity of the Memory Stick 31 for recording the moving-picture data in step S35. The following describes this processing of step S35 with reference to FIG. 8.

Figure 8:
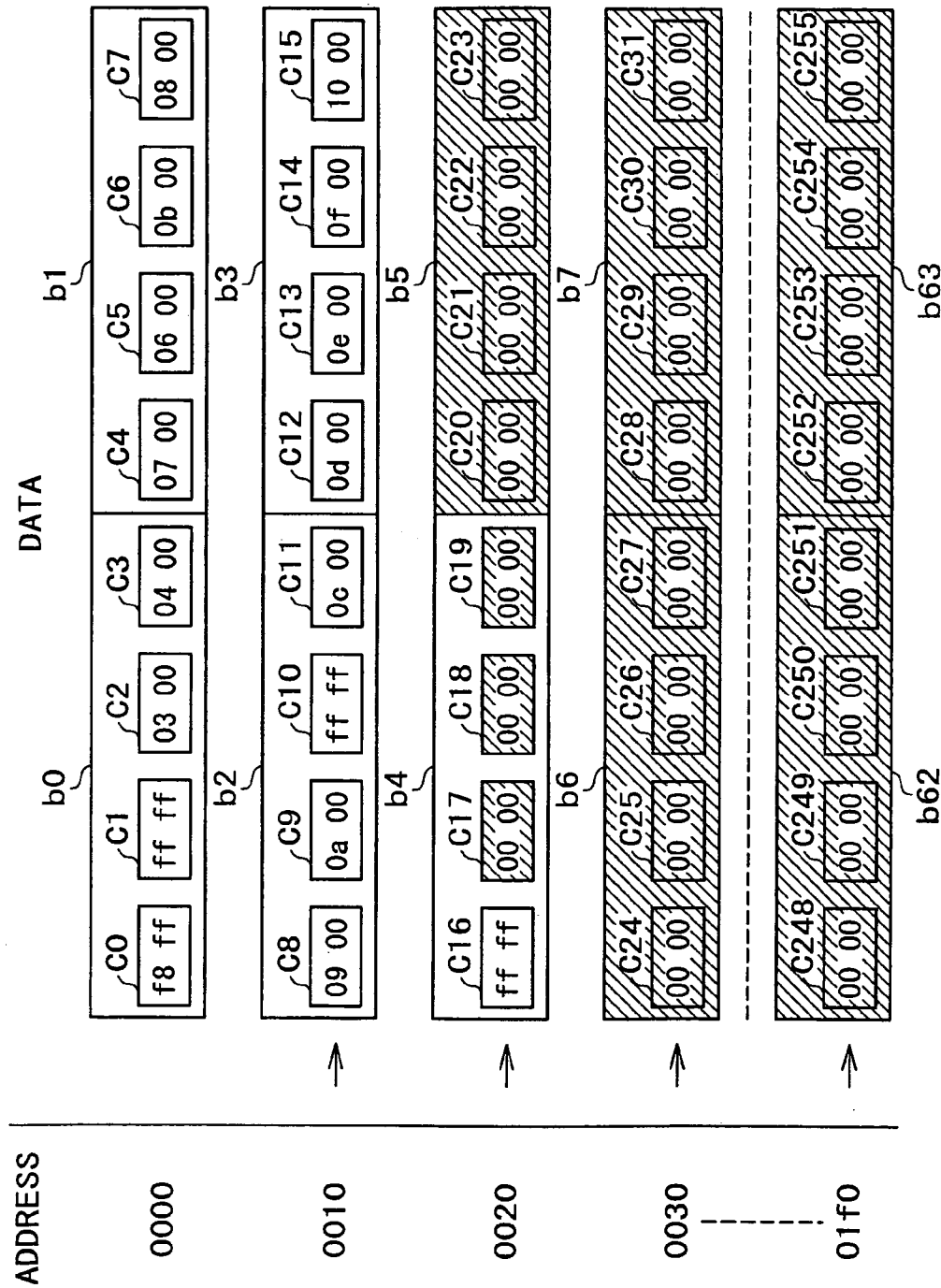
FIG. 8 is a diagram for describing another example of the FAT data in the recording processing shown in FIG. 6.

Referring to FIG. 8, there is shown the FAT data of one sector of the FATI 54 in the case of the 16-bit FAT system. It should be noted that, with reference to FIG. 8, similar components previously described with reference to FIG. 4 are denoted by the same reference numerals and their description will be skipped for the brevity of description.

As with "0000", "0010", "0020", and "0030" shown in FIG. 4, address "01f0" to the left of the figure is the internal address at which the data of the FATI 54 are written, indicating the 32nd address from "0000". Therefore, the second byte "00" forming entry c255 indicates the 512th data from the first byte "f8" (the start data of the FAT data) forming entry c0.

The erasure block size obtained in the processing of step S31 is 128 Kbytes and the cluster size obtained in the processing of step S32 is 32 Kbytes, so that it is apparent that the data block (the erasure block) of the Memory Stick 31 is configured by four clusters and; as shown in FIG. 6, data block 0 of clusters 0 through 3 corresponds to erasure block n and data block 1 of clusters 4 through 7 corresponds to erasure block n+1.

Consequently, as shown in FIG. 8, the information of each cluster of the FAT data is also gathered up in correspondence to data block 0 (erasure block n) with entries c0 through c3 being block b0. Likewise, entries c4 through c7 are gathered up as block b1, entries c8 through c11 as block b2, entries c12 through c15 as block b3, and entries c16 through c19 as block 4. Further, entries c20 through c23 are gathered up as block b5, entries c24 through c27 as block b6, and entries c28 through c31 as block b7. Still further, entries c248 through c251 are gathered up as block b62 and entries c252 through c255 as block b63. Thus, the cluster information is also gathered up for each data block which is equivalent to the erasure block.

In this imaging apparatus 1, in recording moving-picture data, the CPU 11 detects a data block of which clusters are all free from the start data of the FATI 54 data and records the moving-picture data starting with the clusters of the detected data block. Therefore, in step S35, the remaining capacity of this Memory Stick 31 is calculated on the basis of the number of clusters of the detected data block.

For example, in the example shown in FIG. 8, the data blocks each of which clusters (four clusters) are free areas "00" "00" are those corresponding to blocks b5 through b63. Only the clusters of these data blocks provide the free areas in the moving-picture mode. In block b4, entries c17 through c19 are "00" "00" but entry c16 is "ff" "ff". Namely, clusters 17 through 19 are free areas but cluster 16 is used, so that the data block corresponding to block b4 is not a free area.

Therefore, in this case, in step S36, the CPU 11 determines that the data blocks corresponding to blocks b5, b6, b7, and so on are free areas and calculates the remaining capacity of the Memory Stick 31 on the basis of the number of clusters in these data blocks.

In example shown in FIG. 8, the data block start position is adjusted such that it is matched with cluster 0 which is the logical first cluster managed by the FAT, so that the boundary of one sector (the data at the 512th byte, namely the second data of entry c 255) matches the data block boundary (block b63). Consequently, in the detection of the data blocks which are free areas, the FAT data may be detected by reading the FAT data sector by sector, so that the detection of the data block which are free areas may be efficiently executed.

On the contrary, in the example shown in FIG. 9, no special adjustment is performed on the data block start position and therefore the data of the data area 57 are recorded starting with cluster 2, which is the first of the substantially recordable area.

Therefore, as shown in FIG. 9, the information of each cluster of the FAT data is also gathered up in correspondence to data block 0 (erasure block n) with entries c2 through c5 being block d0. Likewise, entries c6 through c9 are gathered up as block d1, entries c10 through c13 as block d2, entries c14 through c17 as block d3, and entries c18 through c21 as block d4. Entries c22 through c25 are gathered up as block d5, entries c26 through c29 as block d6, and entries c30 through c33 as block d7. Entries c246 through c249 are gathered up as block d61, entries c250 through c253 as block d62, and entries c254 through c257 as block d63.

Namely, in the example shown in FIG. 9, block d63 to which data block 63 including the data at the 512th byte which forms the boundary of one sector extends over two sectors, the sector shown in FIG. 9 and the following sector. For the detection of this data block 63, it is necessary to detect free areas in two sectors, the sector in which entries c254 and c255 (the data at the 512th byte) exist and sector in which entries c256 (the data at the 513th byte, namely, the data at the first byte of the next sector) and entry c257 exist, thereby lowering the detection speed.

Thus, the data block start position is adjusted such that it is matched with cluster 0, which is the logical first cluster managed by the FAT, so that, as compared with the case in which no such adjustment is executed, the detection of the data blocks of free areas may be efficiently executed.

Next, in step S37, the CPU 11 determines whether or not the imaging mode (set by the CPU 11 on the basis of the data entered through the input unit 18) is the moving-picture mode. If the imaging mode is found to be the moving-picture mode, then, in step S38, the CPU 11 determines on the basis of the remaining capacity for the moving-picture mode calculated in the processing of step S36 whether or not there is any remaining capacity in the Memory Stick 31.

If any remaining capacity in the Memory Stick 31 is found in step S38, then, in step S39, the CPU 11 displays the remaining capacity on the monitor of the output unit 19 and sequentially records the moving-picture data to the flash memory 103 in units of data blocks (or erasure blocks), starting with the first data block of which clusters (four clusters) are all free areas, the first data block being detected from the start data of the FAT data.

Namely, the CPU 11 manages the recording of data in units of clusters, whereas the CPU 101 records the data in units of erasure blocks. The four consecutive clusters to be recorded by the CPU 11 form one erasure block, so that the CPU 101 may store the data of the four consecutive clusters into the RAM 104, thereby quickly storing these data into the flash memory 103 as the data of one erasure block.

In step S40, the CPU 11 determines whether or not the recording of the moving-picture data has been completed. If the recording of the moving-picture data is found not completed, then the CPU 11 returns to step S35 to repeat the above-mentioned processing therefrom. If the recording of the moving-picture data is found completed in step S40, then the recording processing comes to an end.

On the other hand, if the recording mode is found to be not the moving-picture mode (namely, it is found to be the still-picture mode) in step S37, then the CPU 11 determines in step S41 whether or not there is any remaining capacity in the Memory Stick 31 on the basis of the remaining capacity for the still-picture mode calculated in the processing of step S35.

If any remaining capacity in the Memory Stick 31 is found in step S41, then the CPU 11 displays, in step S42, the remaining capacity on the monitor of the output unit 19 and sequentially records the still-picture data in units of clusters, starting with the cluster which is the first free area, the cluster being detected from the start of the FAT data.

For example, as shown in FIG. 8, the CPU 11 instructs the CPU 101 to detect entry c17, which is the first "00" "00" (free area) in the FAT data and record the still-picture data in units of clusters to the clusters which are free areas, starting with cluster 17 corresponding to detected entry c17.

At this moment, the CPU 101 reads the data of the erasure block corresponding to block b4 (the data for four clusters) from the flash memory 103 and temporarily stores the data into the RAM 104. Then, the CPU 101 updates, in the RAM 104, the data of the cluster corresponding to entry c17 by the data to be recorded, reads the data for four clusters (one erasure block) again, and stores the data in the corresponding erasure block.

The recording time is greater than that for moving-picture data, but still-picture data are smaller in total data amount than moving-picture data, so that the above-mentioned process does not present any problems in practical use.

Then, in step S40, the CPU 11 determines whether or not the recording of the still-picture data has been completed. If the recording of the still-picture data is found not completed, then the CPU 11 returns to step S35 to repeat the above-mentioned processing therefrom. If the recording of the still-picture data is found completed in step S40, the recording processing comes to an end.

If the remaining capacity of the Memory Stick 31 is found nil in step S38 or step S41, then the CPU 11 controls, in step S43, the output unit 19 to display a message that there is no remaining capacity in the Memory Stick 31 onto the monitor.

It should be noted that, in the above description, if there is no remaining capacity of the Memory Stick 31, it is displayed on the monitor of the output unit 19 for example; it is also practicable to display how much remaining capacity there is in the Memory Stick 31 on the basis of the obtained remaining capacity.

As described, the number of clusters equivalent to the erasure blocks of the Memory Stick 31 are gathered up as a data block and moving-picture data are recorded in units of data blocks (namely, erasure blocks), so that, if the erasure block size of the Memory Stick 31 gets larger, resulting in lowered recording speeds, the above-mentioned processing may prevent the realtime recording from being disabled.

As described above, the data block start position is adjusted such that it is matched with cluster 0, which is the logical first cluster managed by the FAT, so that, as compared with the case in which no such adjustment is executed, the detection of data blocks, which are free areas, may be efficiently executed.

Thus, because a conventional FAT file system of an OS is used, data may be recorded to the Memory Stick 31 on general-purpose computers. Further, because the cluster size is not large, the usage efficiency of the memory space is not deteriorated.

In step S4 of the above-mentioned initialization processing described with reference to the flowchart of FIG. 5, the CPU 11 adjusts the data block start position and executes the initialization processing on the basis of data blocks. It is also practicable for the CPU 11 to instruct the CPU 101 to initialize the Memory Stick 31. In this case, the CPU 101 initializes the flash memory 103 on the basis of the information of data blocks set to the device and the data block start position.

As described, when data of high bit rates such as moving-picture are recorded, the data are recorded to free areas in units of data blocks corresponding to the erasure blocks in a loaded recording medium, so that, if the erasure block size of the flash memory gets larger, the speed of recording may be enhanced.

In the case of still-picture data, the data are recorded to free areas in units of clusters, so that wasted free areas may be prevented from occurring in the Memory Stick 31.

It should be noted that, if it is desired to prevent the recording speed from being lowered in the case of still-picture data, the data may be recorded in the above-mentioned units of data blocks. It is also practicable to let the user select between the increasing of recording speed and the increasing of recording capacity.

In the above-mentioned configuration, the Memory Stick functioning as a flash memory is used for the recording medium. It will be apparent that the present invention is applicable to other types of semiconductor memories.

The above-mentioned sequence of processing operations may be executed not only by hardware but also by software. In the software approach, the programs constituting the software are installed from a program storage medium into a computer incorporated in a dedicated hardware apparatus or a general-purpose personal computer for example which is able to execute various functions by installing various programs.

A program storage medium for storing programs which are installed in a computer and made executable by the computer is constituted by a package media including a magnetic disk 41 (including flexible disk), an optical disk 42 (including CD-ROM (Compact Disc-Read Only Memory) and DVD (Digital Versatile Disc)), a magneto-optical disk (including MD (Mini-Disc) (trademark)), or a semiconductor memory 44 (including Memory Stick (trademark)) or the storage unit 20 in which programs are stored temporarily or permanently as shown in FIG. 1.

It should be noted herein that the steps for describing each program recorded in recording media include not only the processing operations which are sequentially executed in a time-series manner but also the processing operations which are executed concurrently or discretely.

It should be noted that the term system as used herein denotes an entire apparatus constituted by a plurality of apparatuses.

INDUSTRIAL APPLICABILITY

As described and according to the invention, data may be recorded to a recording medium. In addition, according to the invention, even if the erasure block size of the recording medium gets larger, the speed of recording may be enhanced. Further, according to the invention, the lowering of the recording speed may be minimized while maintaining the compatibility with general-purpose devices.

What is claimed is:

1. A recording apparatus for managing data in a computer-readable medium in which data are recorded in units of an erasure block configured by a plurality of clusters, comprising:

first detecting means for detecting said plurality of clusters which are free;

second detecting means for detecting said erasure block in which said plurality of clusters are all free;

means for obtaining an erasure block size in at least one portion of said recording medium;

means for obtaining a cluster size in said at least one portion of said recording medium;

means for obtaining a data block size based upon said erasure block size and said cluster size, said data block size representing a number of said clusters which form one said erasure block;

means for adjusting a data block start position to one said erasure block in which said plurality of clusters are all free; and recording means for recording data to said plurality of clusters of said erasure block detected by said second detecting means beginning at said data block start position.

2. The recording apparatus according to claim 1, wherein said computer-readable medium is a flash memory.

3. The recording apparatus according to claim 1, wherein a FAT system is formed in said computer-readable medium and said first detecting means detects said plurality of free clusters from said FAT.

4. The recording apparatus according to claim 1, further comprising:

first calculation means for calculating a remaining free capacity of said computer-readable medium from the number of said clusters detected by said first detecting means; and second calculation means for calculating a remaining free capacity of said computer-readable medium from the number of said clusters of said erasure block detected by said second detecting means.

5. The recording apparatus according to claim 4, further comprising determining means for determining whether or not data to be recorded to said computer-readable medium is moving-picture data, wherein if said data to be recorded to said computer-readable medium is found by said determining means to be moving-picture data, then said recording means records said data to said plurality of clusters of said erasure block detected by said second detecting means.

6. The recording apparatus according to claim 4, still further comprising:

determining means for determining whether or not data to be recorded to said computer-readable medium is still-picture data, wherein if said data to be recorded to said computer-readable medium is found by said determining means to be still-picture data, then said computer-readable medium records said data to said plurality of clusters detected by said first detecting means.

7. The recording apparatus according to claim 4, yet further comprising:

display means for displaying a free remaining capacity of said computer-readable medium obtained by said first calculation means or said second calculation means.

8. The recording apparatus according to claim 7, further comprising:

determining means for determining whether or not data to be recorded to said computer-readable medium is moving-picture data, wherein if said data to be recorded to said computer-readable medium is found by said determining means to be moving-picture data, then said display means displays said remaining free capacity of said computer-readable medium obtained by said second calculation means.

9. The recording apparatus according to claim 7, still further comprising:

determining means for determining whether or not data to be recorded to said computer-readable medium is still-picture data, wherein if said data to be recorded to said recording medium is found by said determining means to be still-picture data, said display means displays said remaining free capacity of said computer-readable medium obtained by said first calculation means.

10. A recording method for a recording apparatus for managing data in a computer-readable medium in which data is recorded in erasure blocks each configured to contain a plurality of clusters, said recording method comprising the steps of:

detecting which of said plurality of clusters are free;

detecting one of said erasure blocks in which said plurality of clusters are all free;

obtaining an erasure block size in at least one portion of said recording medium;

obtaining a cluster size in said at least one portion of said recording medium;

obtaining a data block size based upon said erasure block size and said cluster size, said data block size representing a number of said clusters which form one said erasure block;

adjusting a data block start position to one said erasure block in which said plurality of clusters are all free; and recording data to said plurality of clusters of said erasure block in which said plurality of clusters are all free beginning at said data block start position.

11. A computer-readable medium storing a program for a recording apparatus for managing data in a computer-readable medium in which data are recorded in units of an erasure block configured by a plurality of clusters, said program comprising the steps of:

detecting which of said plurality of clusters are free;

for detecting one of said erasure blocks in which said plurality of clusters are all free;

obtaining an erasure block size in at least one portion of said recording medium;

obtaining a cluster size in said at least one portion of said recording medium;

obtaining a data block size based upon said erasure block size and said cluster size, said data block size representing a number of said clusters which form one said erasure block;

adjusting a data block start position to one said erasure block in which said plurality of clusters are all free; and recording data to said plurality of clusters of said erasure block in which said plurality of clusters are all free beginning at said data block start position.

12. A method for controlling a recording apparatus for managing data in a computer-readable medium in which data is recorded in units of an erasure block configured by a plurality of clusters, said program method comprising the steps of:

detecting which of said plurality of clusters are free;

detecting one of said erasure blocks in which said plurality of clusters are all free;

obtaining an erasure block size in at least one portion of said recording medium;

obtaining a cluster size in said at least one portion of said recording medium;

obtaining a data block size based upon said erasure block size and said cluster size, said data block size representing a number of said clusters which form one said erasure block;

adjusting a data block start position to one said erasure block in which said plurality of clusters are all free; and recording data to said plurality of clusters of said erasure block in which said plurality of clusters are all free beginning at said data block start position.

\* \* \* \* \*